(12) United States Patent
Yin et al.

(10) Patent No.: US 12,443,675 B2
(45) Date of Patent: Oct. 14, 2025

(54) CROSSBAR CIRCUITS FOR PERFORMING CONVOLUTION OPERATIONS

(71) Applicant: TetraMem Inc., Fremont, CA (US)

(72) Inventors: Wenbo Yin, Alameda, CA (US); Hengfang Zhu, Fremont, CA (US)

(73) Assignee: TetraMem Inc., San Jose, CA (US)

( * ) Notice: Subject to any disclaimer, the term of this patent is extended or adjusted under 35 U.S.C. 154(b) by 47 days.

(21) Appl. No.: 18/517,320

(22) Filed: Nov. 22, 2023

(65) Prior Publication Data

US 2025/0165555 A1    May 22, 2025

(51) Int. Cl.
*G06F 17/15* (2006.01)
*G11C 13/00* (2006.01)

(52) U.S. Cl.
CPC ............ *G06F 17/15* (2013.01); *G11C 13/003* (2013.01); *G11C 13/004* (2013.01); *G11C 13/0069* (2013.01); *G11C 2213/79* (2013.01)

(58) Field of Classification Search
CPC ..... G06F 17/15; G11C 13/003; G11C 13/004; G11C 13/0069; G11C 2213/79
See application file for complete search history.

(56) References Cited

U.S. PATENT DOCUMENTS

| | | | |
|---|---|---|---|
| 11,107,527 B1* | 8/2021 | Yin | G11C 13/004 |
| 2020/0082252 A1* | 3/2020 | Ge | G11C 5/02 |
| 2020/0193277 A1* | 6/2020 | Kwon | G06F 7/5443 |
| 2023/0097363 A1* | 3/2023 | Nam | G11C 13/0023 |
| | | | 365/189.02 |

* cited by examiner

*Primary Examiner* — Jerome Leboeuf
(74) *Attorney, Agent, or Firm* — Jaffery Watson Hamilton & DeSanctis LLP

(57) ABSTRACT

In some embodiments, an apparatus for performing convolution operations is provided. The apparatus may include multiple crossbar arrays and select circuits. The select circuits are configured to select a first plurality of cross-point devices and a second plurality of cross-point devices in response to receiving a control signal indicating that a regular convolution is to be performed, and to select the first plurality of cross-point devices and a third plurality of cross-point devices in response to receiving a control signal indicating that a depthwise convolution is to be performed. The first plurality of cross-point devices is connected to a first plurality of word lines and a first bit line. The second plurality of cross-point devices is connected to the first plurality of word lines and a second bit line. The third plurality of cross-point devices is connected to a second plurality of word lines and the second bit line.

11 Claims, 10 Drawing Sheets

CROSSBAR CIRCUITS FOR PERFORMING CONVOLUTION OPERATIONS

TECHNICAL FIELD

The implementations of the disclosure relate generally to crossbar circuits and, more specifically, to crossbar circuits that can perform regular convolution operations and depthwise convolution operations using the same crossbar arrays.

BACKGROUND

A crossbar circuit may refer to a circuit structure with interconnecting electrically conductive lines sandwiching a memory element, such as a resistive switching material, at their intersections. The resistive switching material may include, for example, a memristor (also referred to as resistive random-access memory (RRAM or ReRAM)). Crossbar circuits may be used to implement in-memory computing applications, non-volatile solid-state memory, image processing applications, neural networks, etc.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to one or more aspects of the present disclosure, an apparatus for performing convolution operations is provided. The apparatus includes a plurality of crossbar arrays of cross-point devices and one or more select circuits. The plurality of crossbar arrays of cross-point devices include a first plurality of cross-point devices connecting to a first plurality of word lines, a first bit line, and a first select line; a second plurality of cross-point devices connecting to the first plurality of word lines, a second bit line, and a second select line; and a third plurality of cross-point devices connecting to a second plurality of word lines, the second bit line, and a third select line. The one or more select circuits are configured to: select the first plurality of cross-point devices and the second plurality of cross-point devices in response to receiving a first control signal indicating that a regular convolution is to be performed using the plurality of crossbar arrays of cross-point devices; and select the first plurality of cross-point devices and the third plurality of cross-point devices in response to receiving a second control signal indicating that a depthwise convolution is to be performed using the plurality of crossbar arrays of cross-point devices.

In some embodiments, the one or more select circuits include a first multiplexer, wherein a first input of the first multiplexer is connected to the second select line, a second input of the first multiplexer is connected to the first select line, and wherein an output of the first multiplexer is connected to the third select line.

In some embodiments, the first multiplexer is configured to switch between the first input of the first multiplexer and the second input of the first multiplexer based on a control input of the first multiplexer, wherein the first control signal and the second control signal are provided to the first multiplexer via the control input.

In some embodiments, the one or more select circuits are further configured to select a fourth plurality of cross-point devices in response to receiving the second control signal, wherein the fourth plurality of cross-point devices is connected to a third plurality of word lines, a third bit line, and a fourth select line.

In some embodiments, the one or more select circuits include a second multiplexer, wherein a first input of the second multiplexer is connected to a fifth select line, wherein a second input of the second multiplexer is connected to the third select line, and wherein an output of the second multiplexer is connected to the fourth select line.

In some embodiments, a fifth plurality of cross-point devices is connected to the fifth select line, the second plurality of word lines, and the third bit line.

In some embodiments, the plurality of crossbar arrays of cross-point devices includes at least one of a phase-change memory device, a floating gate device, a spintronic device, a ferroelectric device, or a resistive random-access memory device.

In some embodiments, the apparatus further includes a programming circuit to program the conductance of the selected cross-point devices.

In some embodiments, the apparatus further includes a word line logic to provide input signals to the first plurality of word lines and the second plurality of word lines.

In some embodiments, the apparatus further includes a sensing circuit to generate a plurality of output signals representative of convolution results of the input signals and one or more convolution kernels.

In some embodiments, the apparatus further includes a control circuit configured to produce the first control signal and the second control signal.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding.

DETAILED DESCRIPTION

Figure 1:
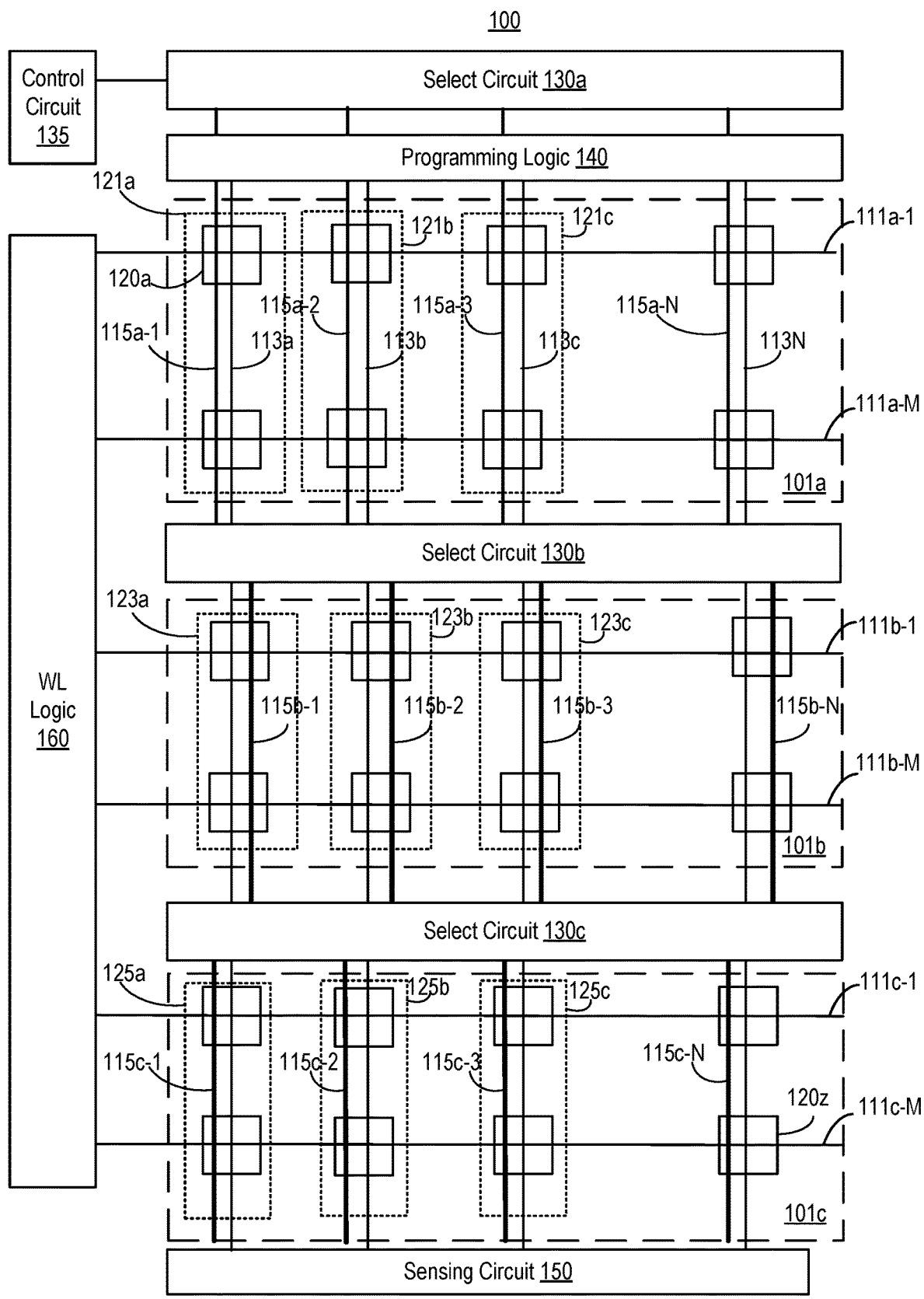
FIG. 1 is a schematic diagram illustrating an example of a crossbar-based apparatus in accordance with some implementations of the disclosure.

Aspects of the disclosure provide crossbar-based apparatuses and crossbar circuits for performing convolution operations and methods for performing the convolution operations using the crossbar-based apparatuses and the crossbar circuits.

Crossbar circuits may be used to implement a neural network executing machine learning algorithms. The neural network may include multiple convolutional layers performing various types of convolution operations, such as regular convolution operations, depth-wise convolution operations, etc. A regular convolution may be performed by applying a single convolution kernel to input data or multiple convolution kernels in parallel to the same input data. More particularly, the convolution kernel may be used to scan each part of the input data with the same size as the convolution kernel to produce a convolution result. The convolution kernel and the input data have the same number of channels. For example, performing a 2D convolution on an image of three channels using a 3×3×3 kernel may involve performing scalar matrix multiplication on portions of the image having a size of 3×3×3 using the 3×3×3 kernel. As another example, performing a depth-wise convolution on the input data may involve convolving each channel of the input data with a respective kernel and stacking the convolved outputs together. As a more particular example, performing depth-wise convolution on the input data may involve convolving each channel of the input data using a 3×3 kernel. As such, performing regular convolution and depth-wise convolution on the same input data may involve convolving different portions of the input data using different kernels.

The present disclosure provides crossbar-based apparatuses that may perform regular convolution operations and depth-wise convolution operations using the same crossbar architecture. In some embodiments, a crossbar-based apparatus may include cross-point devices arranged as multiple crossbar arrays. For example, a first crossbar array may include cross-point devices connected to a first plurality of word lines and a plurality of bit lines. A second crossbar array may include cross-point devices connected to a second plurality of word lines and the bit lines. A third crossbar array may include cross-point devices connected to a third plurality of word lines and the bit lines. The crossbar-based apparatus may further include one or more select circuits configured to select one or more portions of the crossbar arrays for performing various types of convolution operations. For example, the select circuits may select the cross-point devices in the first crossbar array, the second crossbar array, and the third crossbar array that are connected to a first bit line for storing a first kernel for performing a regular convolution operation. The select circuits may further select the cross-point devices in the first crossbar array, the second crossbar array, and the third crossbar array that are connected to a second bit line for storing a second kernel for performing the regular convolution operation. The selected cross-point devices may be programmed to store the kernels for performing the regular convolution operation.

As another example, the select circuits may select the cross-point devices in the first crossbar array that are connected to the first bit line for storing a first channel of a depthwise convolution kernel. The select circuits may further select the cross-point devices in the second crossbar array that are connected to the second bit line for storing a second channel of the depthwise convolution kernel. The select circuits may further select the cross-point devices in the third crossbar array that are connected to a third bit line to store a third channel of the depthwise convolution kernel.

While input signals representative of input data to be convolved are applied to the selected cross-point devices, the cumulative current through the bit lines connected to the selected cross-point devices may represent the convolution results.

FIG. 1 is a schematic diagram illustrating an example 100 of a crossbar circuit for performing convolution operations in accordance with some embodiments of the present disclosure. The crossbar circuit 100 may also be referred to herein as a crossbar-based apparatus. The crossbar circuit 100 may be a neural processing unit (NPU) or a part of an NPU for executing machine learning algorithms.

The crossbar circuit 100 may include a plurality of intersecting wires, such as word lines 111a-1, ..., 111a-M, 111b-1, ..., 111b-M, 111c-1, ..., and 111c-M, bit lines 113a, 113b, 113c, ..., 113N. The crossbar array may further include one or more cross-point devices 120a-120z connecting the intersections between the word lines and the bit lines. For example, the cross-point device may be connected to the word line 111a-1 and the bit line 113a. Each of the cross-point devices may include a device with programmable resistance, such as a phase-change memory device, a floating gate device, a spintronic device, a ferroelectric device, a resistive random-access memory device, etc. In some embodiments, the cross-point device 120a-120z may be and/or include a circuit structure of one-transistor-one-memristor (1T1M), a one-selector-one-resistor (1S1R) structure, a two-resistor (2R) structure, etc. In some embodiments, one or more cross-point devices 120a-120z may include a cross-point device as described in connection with FIG. 2A and/or FIG. 2B.

As shown, the cross-point devices 120a-z may be arranged as crossbar arrays 101a, 101b, and 101c. Each of the crossbar arrays may include M×N cross-point devices connecting to M word lines and N bit lines. More particularly, for example, each cross-point device in the crossbar array 101a may be connected to a word line 111a-1, ..., 111a-M (also referred to as the "first plurality of word lines"), a bit line 113a, 113b, 113c, ..., 113N, and a select line 115a-1, 115a-2, 115a-3, ..., 115a-N. Each cross-point device in the second crossbar array 101b may be connected to a word line 111b-1, ..., 111b-M (also referred to as the "second plurality of word lines"), one of the bit lines 113a, 113b, 113c, ..., 113N, and a select line 115b-1, 115b-2, 115b-3, ..., 115b-N. Each cross-point device in the third crossbar array 101c may be connected to a word line 111c-1, ..., 111c-M (also referred to as the "third plurality of word lines"), one of the bit lines 113a, 113b, 113c, ..., 113N, and a select line 115c-1, 115c-2, 115c-3, ..., 115c-N.

The cross-point devices that are connected to bit line 113a (also referred to as the "first bit line"), select line 115a-1 (also referred to as the "first select line"), and one of the word lines 111a-1, ..., 111a-M are collectively referred to as cross-point devices 121a (also referred to as the "first plurality of cross-point devices"). The cross-point devices that are connected to bit line 113b (also referred to as the "second bit line"), select line 115a-2 (also referred to as the "second select line"), and one of the word lines 111a-1, ..., 111a-M are collectively referred to as cross-point devices 121b (also referred to as the "second plurality of cross-point devices"). The cross-point devices that are connected to bit line 113c (also referred to as the "third bit line"), select line 115a-3, and one of the word lines 111a-1, ..., 111a-M are collectively referred to as cross-point devices 121c. The cross-point devices that are connected to bit line 113a, select line 115b-1, and one of the word lines 111b-1, . . . , 111b-M are collectively referred to as cross-point devices 123a. The cross-point devices that are connected to bit line 113b, select line 115b-2 (also referred to as the "third select line"), and one of the word lines 111b-1, . . . , 111b-M are collectively referred to as cross-point devices 123b (also referred to as the "third plurality of cross-point devices"). The cross-point devices that are connected to bit line 113a, select line 115c-1, and one of the word lines 111c-1, . . . , 111c-M are collectively referred to as cross-point devices 125a. The cross-point devices that are connected to bit line 113b, select line 115c-2, and one of the word lines 111c-1, . . . , 111c-M are collectively referred to as cross-point devices 125b. The cross-point devices that are connected to bit line 113c, select line 115c-3 (also referred to as the "fourth select line"), and one of the word lines 111c-1, . . . , 111c-M are collectively referred to as cross-point devices 125c (also referred to as the "fourth plurality of cross-point devices"). The cross-point devices that are connected to bit line 113c, select line 115b-3 (also referred to as the "fifth select line"), and one of the word lines 111b-1, . . . , 111b-M are collectively referred to as cross-point devices 123c (also referred to as the "fifth plurality of cross-point devices").

While three crossbar arrays are illustrated in FIG. 1, this is merely illustrative. The crossbar circuit 100 may include any suitable number of crossbar arrays and/or cross-point devices for performing convolution operations using kernels of desirable sizes.

The crossbar circuit 100 may include one or more select circuits 130a, 130b, . . . , 130c for selecting and/or enabling one or more cross-point devices 120a-z for in-memory computing. As shown, a cross-point device in the first crossbar array 101a may be connected to select circuit 130a via a select line 115a-1, . . . , 115a-j, . . . , or 115a-M. A cross-point device in the second crossbar array 101b may be connected to select circuit 130b via a select line 115b-1, . . . , 115b-j, . . . , or 115b-M. A cross-point device in the third crossbar array 101c may be connected to select circuit 130c via a respective select line 115c-1, . . . , 115c-j, . . . , or 115c-M. Select circuits 130a, 130b, and/or 130c may select a cross-point device by applying a suitable select voltage to a select line connected to the cross-point device.

Control circuit 135 may produce and provide control signals (e.g., voltage signals, current signals) to control select circuits 130a, 130b, . . . , 130c. The value of the control signals may indicate whether a regular convolution or a depthwise convolution is to be performed. For example, control circuit 135 may produce a first control signal indicating that a regular convolution is to be performed using crossbar arrays 101a, 101b, 101c, etc. As another example, control circuit 135 may produce a second control signal indicating that a depthwise convolution is to be performed using crossbar arrays 101a, 101b, 101c, etc.

In some embodiments, each of the select circuits 130a, 130b, . . . , 130c may include a plurality of multiplexers. Each of the multiplexers may include two inputs and may selectively output one of the inputs based on the control signals provided by control circuit 135. In some embodiments, each of the select circuits 130a, 130b, . . . , 130c may include a select circuit 350 as described in connection with FIG. 3. The select circuits 130a, 130b, and 130c may be connected to each other as described in connection with FIGS. 4A, 4B, and 4C.

As illustrated in FIG. 1, the first crossbar array 101a, the second crossbar array 101b, and the third crossbar array 101c may be connected to a word line (WL) logic 160 via the word lines 111a-1, 111a-M, 111b-1, 111b-M, 111c-1, 111c-M, etc., and may be connected to a programming circuit 140 and a sensing circuit 150 via the bit lines 113a-N. The WL logic 160 may include any suitable component for converting input data into input signals to be applied to crossbar arrays 101a, 101b, . . . , 101c. Each of the input signals may be a voltage signal, a current signal, etc. In some embodiments, the WL logic 160 may include one or more digital-to-analog converters (DACs) that may convert input data into analog signals.

Programming circuit 140 may program one or more cross-point devices selected and/or enabled by select circuits 130a-c to suitable conductance values. For example, programming a cross-point device may involve applying a suitable voltage signal or current signal for the appropriate duration across the cross-point device (e.g., by applying a programming voltage or current to the word line and/or bit line connected to the cross-point device). The resistance of each cross-point device may be electrically switched between a high-resistance state and a low-resistance state. Setting a cross-point device may involve switching the resistance of the cross-point device from the high-resistance state to the low-resistance state. Resetting the cross-point device may involve switching the resistance of the cross-point device from the low-resistance state to the high-resistance state. Programming circuit 140 may program selected cross-point devices to store kernels for performing regular convolution operations and/or depthwise convolution operations. For example, a matrix or convolution kernel may be converted into a vector and mapped to the selected cross-point devices. The conductance values of the cross-point devices may be programmed to values representative of elements of the kernel. In some cases, multiple programming iterations may be required to program the conductance value to within the precision needed to reflect the neural network weight accurately.

Sensing circuit 150 may generate output signals based on the cumulative current flowing through one or more bit lines 113a-113N. Sensing circuit 150 may include any suitable component for converting the current into a digital output. For example, sensing circuit 150 may include multiple current or voltage sense amplifiers, operational amplifiers, comparators, and/or analog-digital converters (ADCs) (not shown). Each of the ADCs may convert the current flowing through a respective bit line into a digital output. In some embodiments, the input signal may include a voltage signal V. The output signal may include a current signal I. The relationship between the input signal and the output signal may be represented as I=VG, wherein G represents the conductance values of the cross-point devices 120. As such, the input signal is weighted at each of the cross-point devices by its conductance according to Ohm's law. The weighted current is output via each bit line and may be accumulated according to Kirchhoff's current law.

Crossbar circuit 100 may be configured to perform vector-matrix multiplication (VMM). A VMM operation may be represented as Y=XA, wherein each of Y, X, A represents a respective matrix. More particularly, for example, input vector X may be mapped to the input voltage V of crossbar arrays 101a, 101b, . . . , 101c. Matrix A may be mapped to conductance values G. The output current I may be read and mapped back to output results Y.

The crossbar circuit 100 can perform different types of convolution operations, such as regular convolutions, depthwise convolutions, etc. Performing a regular convolution on input data may involve applying a single convolution kernel to the input data. The convolution kernel may have a particular size defined by multiple dimensions (e.g., a width, a height, a channel, etc.). The convolution kernel may be applied to a portion of the input data having the same size as the convolution kernel to produce an output. The output may be mapped to an element of the convolution result that is located at a position corresponding to the position of the portion of the input data.

Select circuits 130a-c may select one or more cross-point devices of crossbar arrays 101a, 101b, 101c, etc. according to the control signal produced by control circuit 135. For example, in response to receiving a first control signal indicating that a regular convolution is to be performed, select circuits 130a-c may select a plurality of cross-point devices that are connected to a bit line to store a kernel for performing the regular convolution. More particularly, the cross-point devices 121a, 123a, and 125a may be selected to store a first kernel (e.g., a kernel 520a of FIG. 5A). The cross-point devices 121b, 123b, and 125b may be selected to store a second kernel (e.g., a kernel 520b of FIG. 5B). The cross-point devices 121c, 123c, and 125c may be selected to store the Nth kernel.

Programming circuit 140 may program the selected cross-point devices to store the kernels for performing regular convolution operations. For example, programming circuit 140 may program the cross-point devices 121a, 123a, and 125a to store the first kernel (e.g., a kernel 520a of FIG. 5A). The programming circuit 140 may program the cross-point devices 121b, 123b, and 125b to store the second kernel (e.g., a kernel 520b of FIG. 5B). The programming circuit 140 may program the cross-point devices 121c, 123c, and 125c to store the Nth kernel.

Performing a depth-wise convolution on input data may involve convolving each channel of the input data with a respective channel of a depthwise convolution kernel and stacking the convolved outputs together. In response to receiving the second control signal indicating that a depth-wise convolution is to be performed, select circuits 130a-c may select a plurality of cross-point devices connected to a particular bit line to store a channel of the depthwise convolution kernel. For example, the select circuits 130a-c may select the cross-point devices 121a, 123b, and 125c to store the first channel, the second channel, and the third channel of the depthwise convolution kernel, respectively. The programming circuit 140 may program the cross-point devices 121a (the first plurality of cross-point devices), the cross-point devices 123b (the third plurality of cross-point devices), and the cross-point devices 125c (the fourth plurality of cross-point devices) to conductance values representative of the first channel of the depthwise convolution kernel, conductance values representative of the second channel of the depthwise convolution kernel, and conductance values representative of the third channel of the depthwise convolution kernel, respectively.

The WL logic 160 may convert input data to be convolved into vectors and may further generate input signals representing the vectors. The input signals may be applied to the selected cross-point devices via the word lines connected to the selected cross-point devices.

In response to the application of the input signals, the cumulative current through the bit lines connected to the selected cross-point devices may represent the convolution results. For example, when the selected cross-point devices are programmed to store the kernels for performing the regular convolution operations as described above, the cumulative current through the first bit line 113a may represent the convolution result of the input data and the first kernel (e.g., an output 530a of FIG. 5A). The cumulative current through the second bit line 113b may represent the convolution result of the input data and the second kernel (e.g., an output 530b of FIG. 5A). The cumulative current through the Nth bit line 113N may represent the convolution result of the input data and the Nth kernel.

Figure 5A:
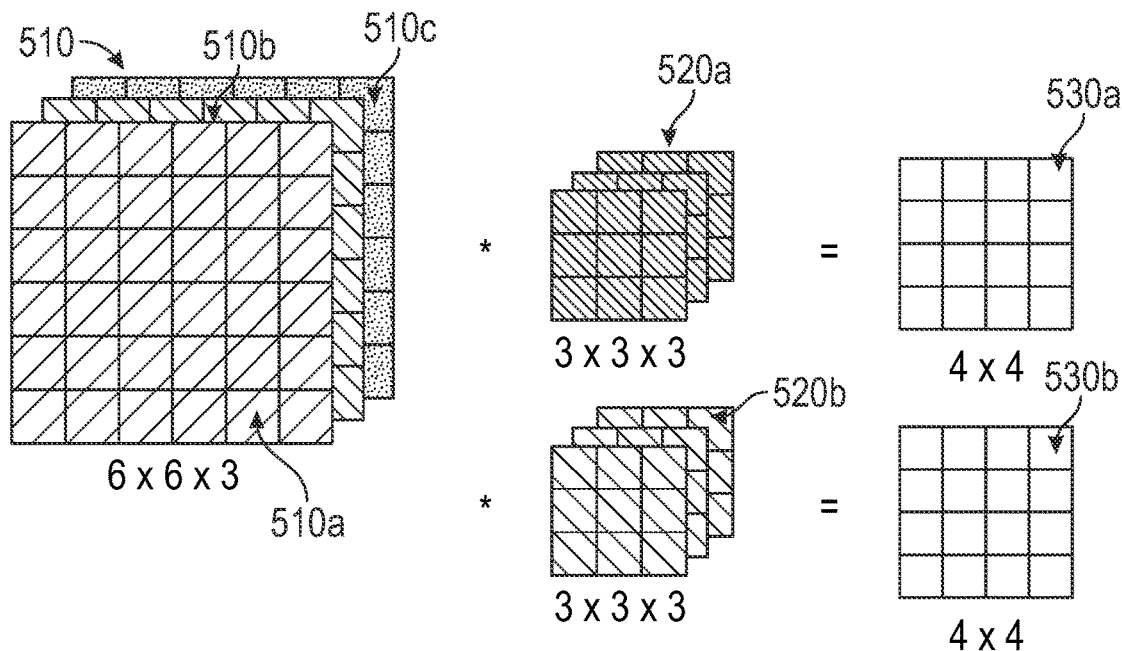
FIG. 5A is a diagram illustrating an example of a regular convolution operation in accordance with some embodiments of the present disclosure.
Figure 5B:
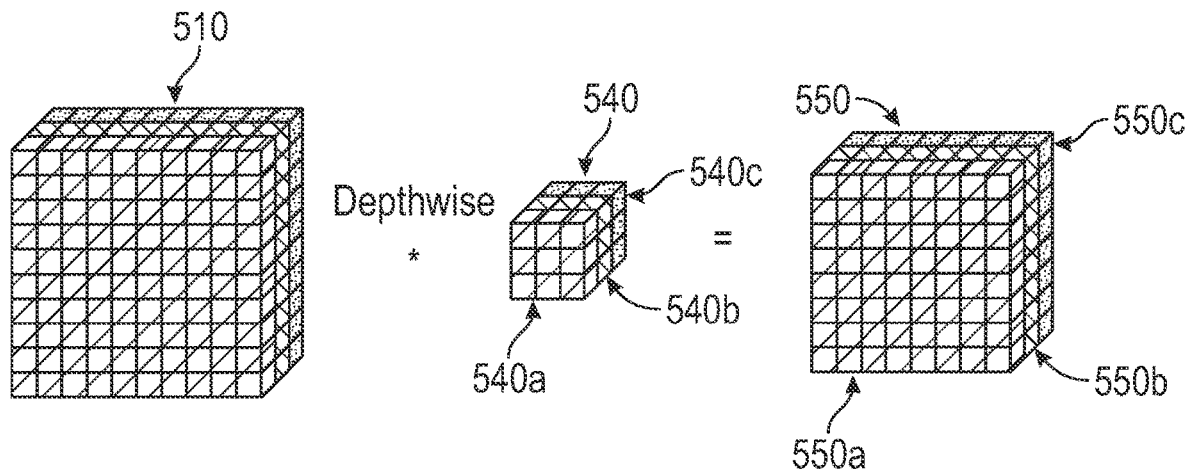
FIG. 5B is a diagram illustrating an example of a depthwise convolution operation in accordance with some embodiments of the present disclosure.

As another example, when the selected cross-point devices are programmed to store the depthwise convolution kernel, the cumulative current through the first bit line 113a may represent the convolution result of the first channel of the input data and the first channel of the depthwise convolution kernel (e.g., an output 550a of FIG. 5B). The cumulative current through the second bit line 113b may represent the convolution result of the second channel of the input data and the second channel of the depthwise convolution kernel (e.g., an output 550b of FIG. 5B). The cumulative current through the Nth bit line 113N may represent the convolution result of the third channel of the input data and the third channel of the depthwise convolution kernel (e.g., an output 550c of FIG. 5B). Sensing circuit 150 may generate output signals based on the current flowing through bit lines 113a-N. The output signals may thus represent the convolution results.

Figure 2A:
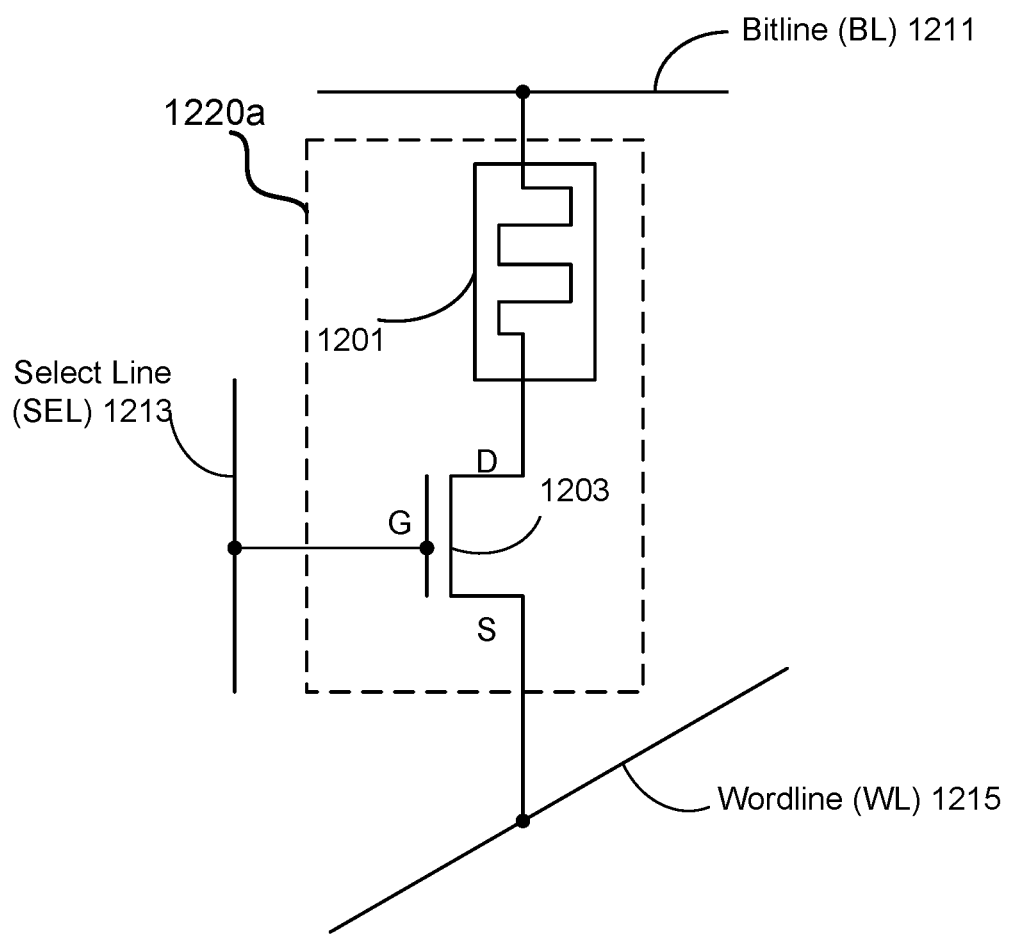
FIGS. 2A and 2B are schematic diagrams illustrating example cross-point devices in accordance with some embodiments of the present disclosure.
Figure 2B:
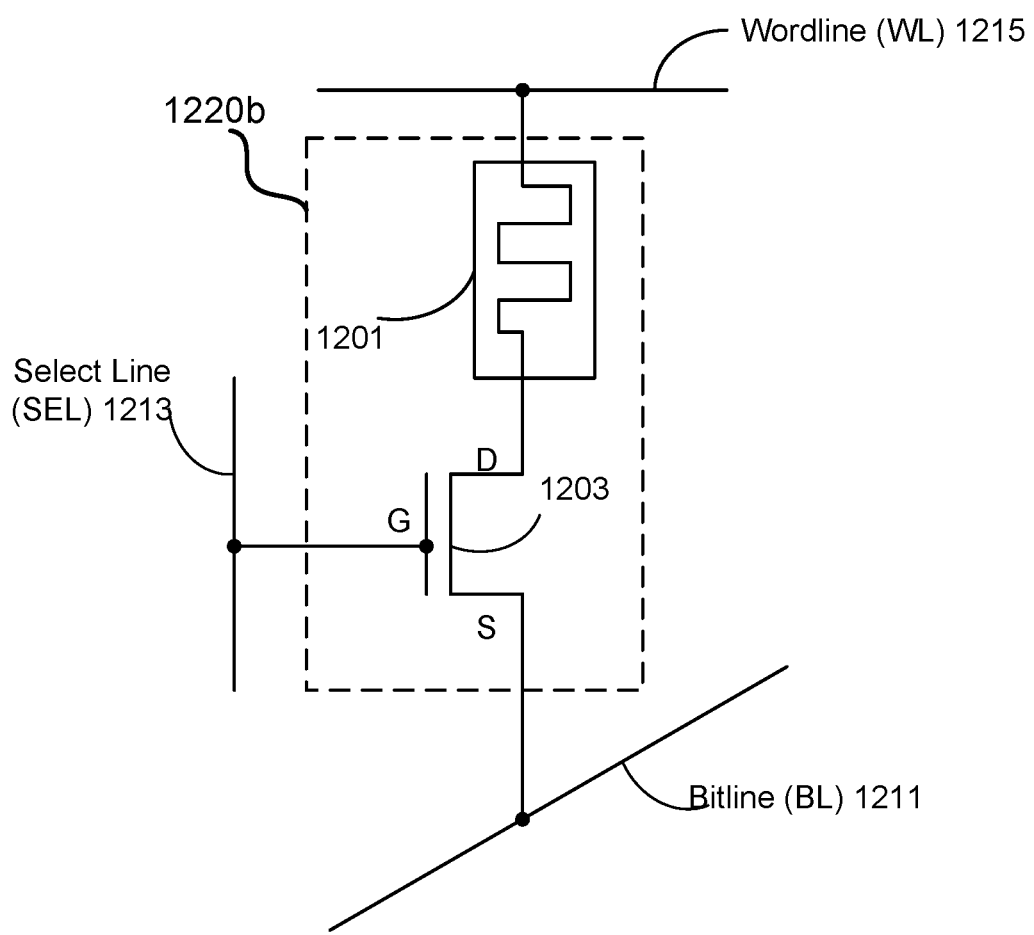

FIGS. 2A and 2B are schematic diagrams illustrating example cross-point devices 1220a and 1220b in accordance with some embodiments of the present disclosure. Each cross-point device 1220a and 1220b may be referred to as a 1-transistor-1-resistor (1T1R) configuration.

As shown in FIGS. 2A and 2B, each of cross-point devices 1220a and 1220b may include an RRAM device 1201 and a transistor 1203 that are connected in series. A transistor may include three terminals that may be marked as gate (G), source(S), and drain (D), respectively. Referring to FIG. 2A, a first terminal of RRAM device 1201 may be connected to the drain of transistor 1203. A second terminal of RRAM device 1201 may be connected to a bit line 1211. The source of the transistor 1203 may be connected to a word line 1215. The gate of transistor 1203 may be connected to a select line 1213.

As shown in FIG. 2B, the second terminal of RRAM device 1201 may be connected to a word line 1215, and the source of the transistor 1203 may be connected to a bit line 1211 in some embodiments. Word line 1215 may correspond to a word line 111a-1, . . . , 111c-M of FIG. 1. Bit line 1211 may correspond to a bit line 113a-113N of FIG. 1.

Transistor 1203 may function as a selector as well as a current limiter and may set the current compliance for RRAM device 1201 during programming. The gate voltage on transistor 1203 can set current compliance for cross-point devices 1220a and 1220b during programming and can thus control the conductance and analog behavior of cross-point devices 1220a and 1220b. For example, when cross-point device 1220a-b is set from a high-resistance state to a low-resistance state, a set signal (e.g., a voltage signal, a current signal) may be provided via bit line (BL) 1211 (or word line (WL) 1215). Another voltage, also referred to as a select voltage or gate voltage, may be applied via select line (SEL) 1213 to the transistor gate to open the gate and set the current compliance, while word line (WL) 1215 (or bit line (BL)) may be grounded. When cross-point device 1220a-b is reset from the low-resistance state to the high-resistance state, a gate voltage may be applied to the gate of transistor 1203 via select line 1213 to open the transistor gate. Meanwhile, a reset signal may be sent to RRAM device 1201 via word line 1215 (or bit line 1211), while bit line 1211 (or word line 1215) may be grounded.

Figure 3:
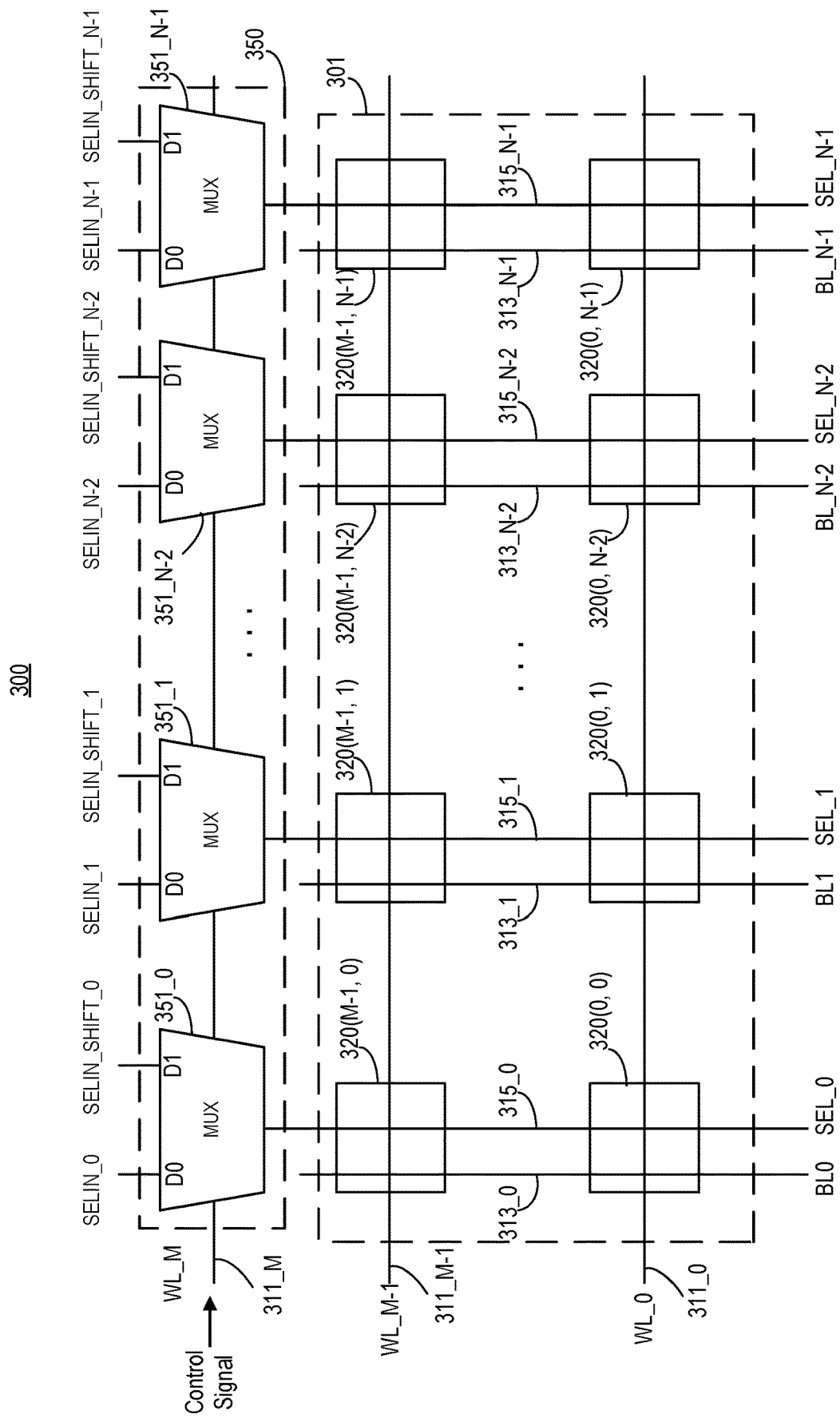
FIG. 3 is a diagram illustrating an example crossbar circuit in accordance with some embodiments of the present disclosure.

FIG. 3 is a diagram illustrating an example crossbar circuit 300 in accordance with some embodiments of the present disclosure. The crossbar circuit 300 is a portion of the crossbar circuit 100 in greater detail.

As shown, crossbar circuit 300 may include a crossbar array 301 and a select circuit 350. Crossbar array 301 may include cross-point devices 320 connected to word lines 311_0, ..., 311_M-1 (i.e., WL_0, ..., WL_M-1), bit lines 313_0, 313_1, ..., 313_N-2, 313_N-1 (i.e., BL_0, BL_1, ..., BL_N-2, BL_N-1), and select lines 315_0, 315_1, ..., 315_N-2, 315_N-1 (i.e., SEL_0, SEL_1, ..., SEL_N-2, SEL_N-1). Crossbar array 301 may include M×N cross-point devices, each of which is connected to a word line, a bit line, and a select line. For example, cross-point devices 320(M-1, 0), 320(M-1, 1), ..., 320(M-1, N-2), 320(M-1, N-1) are connected to word line 311_M-1 and one of the bit lines 313_0, 313_1, ..., 313_N-2, 313_N-1. As another example, cross-point devices 320(0, 0), 320(0, 1), ..., 320(0, N-2), 320(0, N-1) are connected to word line 311_0 and one of the bit lines 313_0, 313_1, ..., 313_N-2, 313_N-1. The cross-point devices that are connected to bit line 313_1 are also connected to select line 315_1. The cross-point devices that are connected to bit line 313_N-1 are also connected to select line 315_N-1.

Select circuit 350 may include multiplexers 351_0, 351_1, ..., 351_N-2, 351_N-1. Each multiplexer (MUX) may include a first input D0, a second input D1, an output, and a control input. The first input D0 and the second input D1 may be connected to a first select signal SELIN (e.g., SELIN_0, SELIN_1, ..., SELIN_N-2, and SELIN_N-1) and a second select signal SELIN_SHIFT (e.g., SELIN_SHIFT_0, SELIN_SHIFT_1, ..., SELIN_SHIFT_N-2, and SELIN_SHIFT_N-1), respectively. The output of the MUX may be connected to a respective select line 315_0, 315_1, ..., 315_N-2, 315_N-1. The control input of the MUX may be connected to a control signal indicative of whether a depthwise convolution is to be performed by the crossbar circuit 300. In some embodiments, the control input may be connected to a word line 311_M. The control signal may be provided to the multiplexers 351_0, 351_1, ..., 351_N-2, and 351_N-1 via the word line 311_M in such embodiments. Each MUX 351_0, 351_1 ..., 351_N-1 may output either the first select signal or the second select signal based on the control signal. In some embodiments in which the control signal indicates that a regular convolution is to be performed by the crossbar circuit 300, the output of each MUX is the first select signal SELIN connected to the MUX (e.g., SELIN_0 connected to MUX 351_0, SELIN_1 connected to MUX 351_1, ..., SELIN_N-2 connected to MUX 351_N-2, and SELIN_N-1 connected to MUX 351_N-1). As such, the first select signal SELIN_0, SELIN_1, ..., SELIN_N-2, SELIN_N-1 may be applied to the cross-point devices via select lines 315_0, 315_1, ..., 315_N-2 and 315_N-1, respectively.

In some embodiments in which the control signal indicates that a depthwise convolution is to be performed by the crossbar circuit 300, the output of each MUX is the second select signal connected to the MUX (e.g., SELIN_SHIFT_0 connected to MUX 351_0, SELIN_SHIFT_1 connected to MUX 351_1, ..., SELIN_SHIFT_N-2 connected to MUX 351_N-2, and SELIN_SHIFT_N-1 connected to MUX 351_N-1). As such, the second select signal SELIN_SHIFT_0, SELIN_SHIFT_1, ..., SELIN_SHIFT_N-2, SELIN_SHIFT_N-1 may be applied to the cross-point devices via select lines 315_0, 315_1, ..., 315_N-2 and 315_N-1, respectively.

Figure 4A:
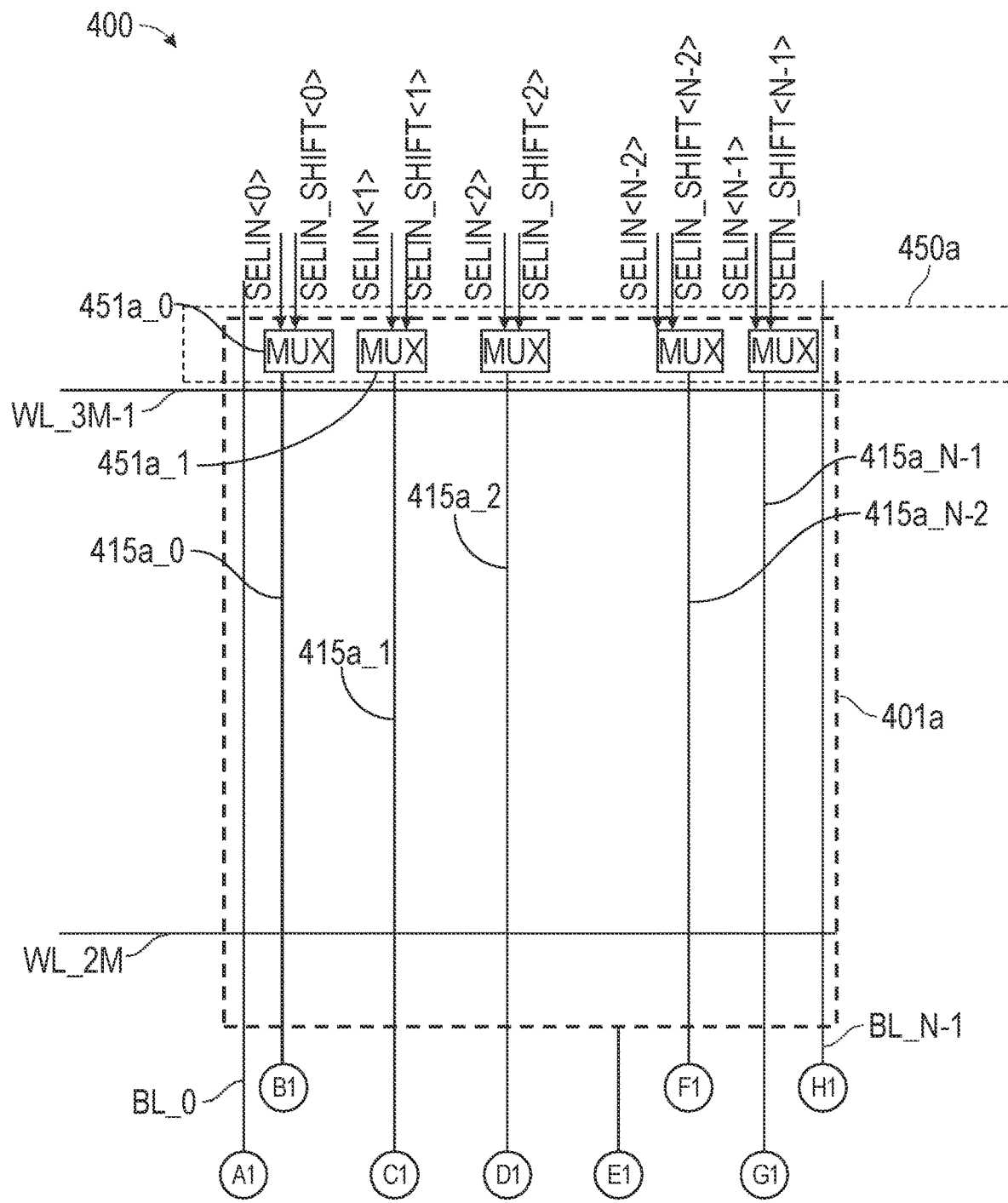
FIGS. 4A, 4B, and 4C are diagrams illustrating an example crossbar circuit in accordance with some embodiments of the present disclosure.
Figure 4B:
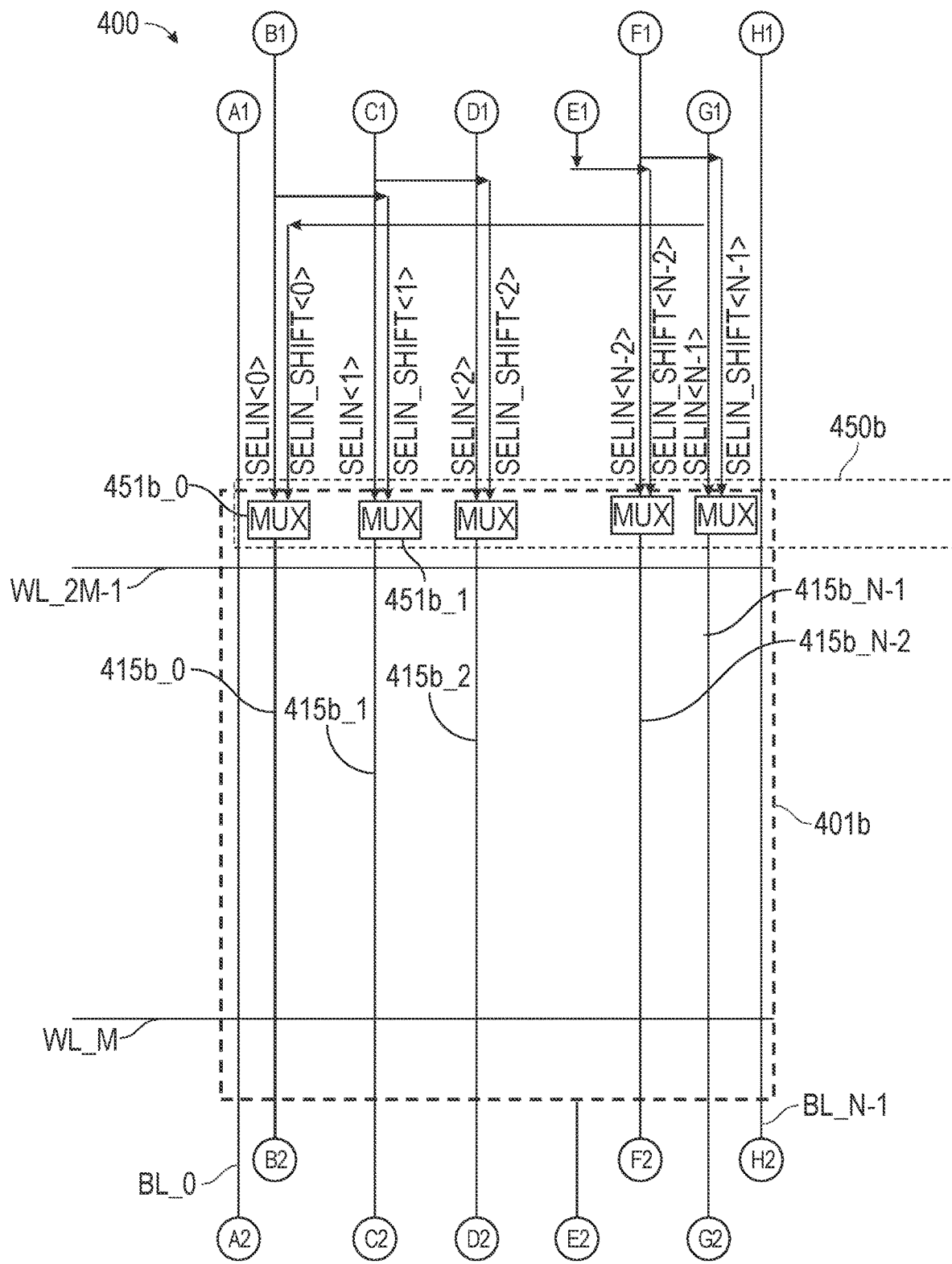
Figure 4C:
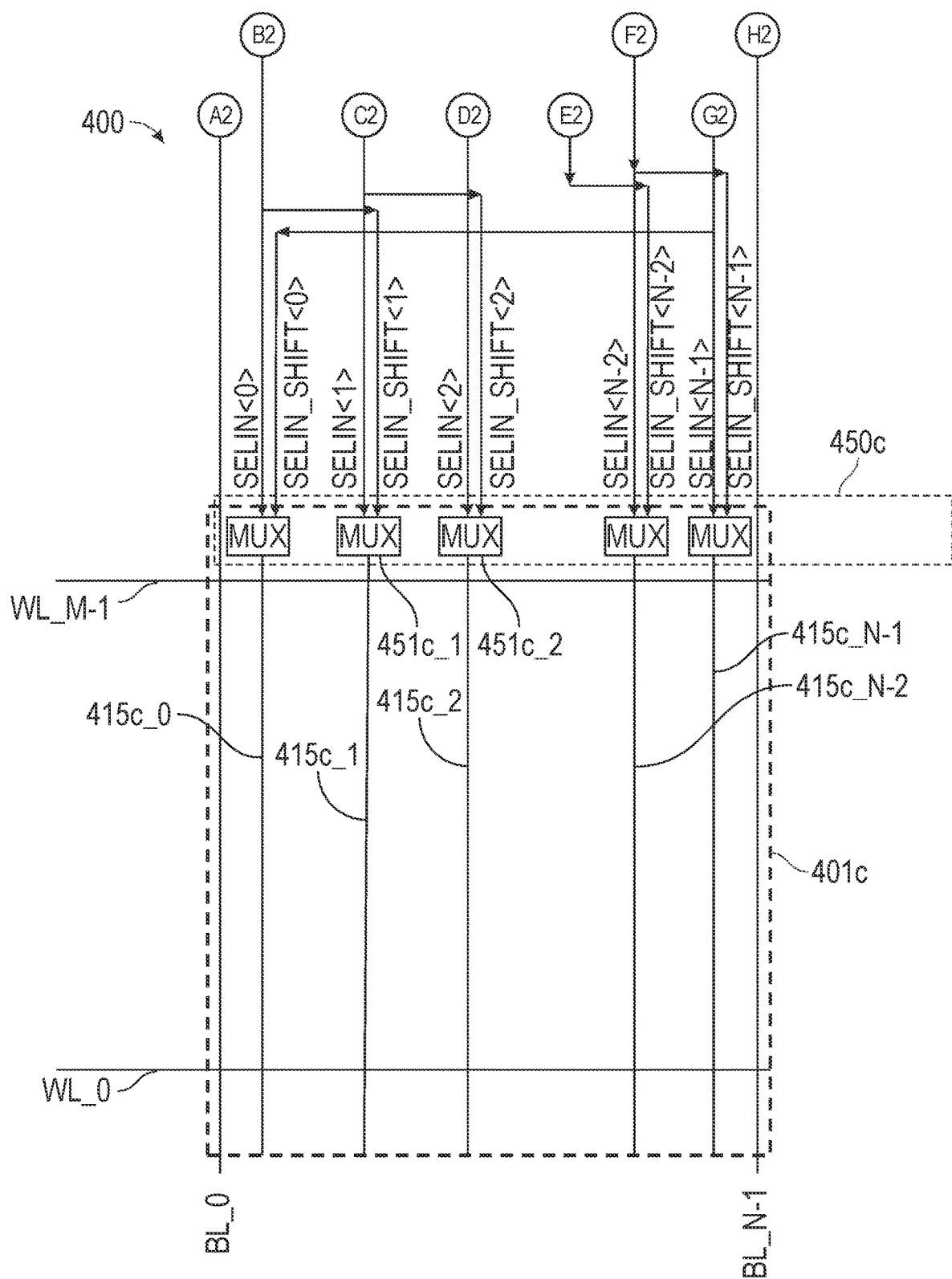

FIGS. 4A, 4B, and 4C are diagrams illustrating an example crossbar circuit 400 in accordance with some embodiments of the present disclosure. The crossbar circuit 400 is split across FIGS. 4A-4C. In FIGS. 4A-4C, reference numbers A1, B1, C1, D1, E1, F1, G1, H1, A2, B2, C2, D2, E2, F2, G2, and H2 represent common connection points for illustrating the crossbar circuit 400 across multiple drawing sheets and do not correspond to components of the crossbar circuit 400.

As shown, crossbar circuit 400 may include a first crossbar array 401a, a second crossbar array 401b, and a third crossbar array 401c. Each of the crossbar arrays 401a, 401b, and 401c may be and/or include a crossbar array 301 as described in connection with FIG. 3. Crossbar circuit 400 may further include a first select circuit 450a, a second select circuit 450b, and a third select circuit 450c. Each select circuit 450a, 450b, and 450c may be and/or include a select circuit 350 of FIG. 3 and may include a plurality of multiplexers.

The first crossbar array 401a may include cross-point devices that are connected to a first plurality of word lines WL_2M, ..., WL_3M-1, bit lines BL_0, ..., BL_N-1, and select lines 415a_0, 415a_1, 415a_2, ..., 415a_N-2, 415a_N-1. The second crossbar array 401b may include cross-point devices that are connected to a second plurality of word lines WL_M, ..., WL_2M-1, the bit lines BL_0, ..., BL_N-1, and select lines 415b_0, 415b_1, 415b_2, ..., 415b_N-2, 415b_N-1. The third crossbar array 401c may include cross-point devices that are connected to word lines WL_0, ..., WL_M-1, the bit lines BL_0, ..., BL_N-1, and select lines 415c_0, 415c_1, 415c_2, ..., 415c_N-2, 415c_N-1. The cross-point devices are not shown in FIGS. 4A-4C for simplicity. Word lines WL_2M, ..., WL_3M-1 may correspond to word lines 111a-1, ..., 111a-M of FIG. 1, respectively. Word lines WL_M, ..., WL_2M-1 may correspond to word lines 111b-1, ..., 111b-M of FIG. 1, respectively. Word lines WL_0, ..., WL_M-1 may correspond to word lines 111c-1, ..., 111c-M of FIG. 1, respectively. Bit lines BL_0, ..., BL_N-1 may correspond to bit lines 113a, ..., 113N of FIG. 1, respectively. Select lines 415a_0, ..., 415a_N-1 may correspond to select lines 115a-1, ..., 115a-N, respectively. Select lines 415b_0, ..., 415b_N-1 may correspond to select lines 115b-1, ..., 115b-N, respectively. Select lines 415c_0, ..., 415c_N-1 may correspond to select lines 115c-1, ..., 115c-N, respectively. The cross-point devices (not shown) in the first crossbar array 401a may correspond to cross-point devices 121a, 121b, 121c, etc. in the crossbar array 101a, as described in connection with FIG. 1. The cross-point devices (not shown) in the second crossbar array 401b may include cross-point devices 123a, 123b, 123c, etc. in the crossbar array 101b, as described in connection with FIG. 1. The cross-point devices (not shown) in the third crossbar array 401c may include cross-point devices 125a, 125b, 125c, etc. in the crossbar array 101c, as described in connection with FIG. 1.

A select line in a given crossbar array (e.g., the first crossbar array 401a) of the crossbar circuit 400 may be connected to a first input of a MUX in a neighboring crossbar array (e.g., the second crossbar array 401b) and a second input of another MUX in the neighboring crossbar array. For example, select line 415a_0 of the first crossbar array 401a is connected to the first input SELIN<0> of MUX 451b_0 and the second input SELIN_SHIFT<1> of MUX 451b_1 (also referred to as the "first multiplexer"). Select line 415a_0 corresponds to the first select line 115a-1 of FIG. 1 and is connected to a first plurality of cross-point devices (not shown in FIGS. 4A-4C) that are further connected to the first bit line BL_0 and the first plurality of word lines WL_2M, . . . , WL_3M−1. The output of MUX 451b_0 is connected to select line 415b_0 of the second crossbar array. The output of MUX 451b_1 may be connected to select line 415b_1 of the second crossbar circuit. Select line 415b_1 may correspond to the third select line 115b-2 of FIG. 1. The first input SELIN<1> of MUX 451b_1 is connected to select line 415a_1 that corresponds to the second select line 115a-2 of FIG. 1. Similarly, select line 415b_1 of the second crossbar array may be connected to the first input SELIN<1> of MUX 451c_1 and the second input SELIN_SHIFT<2> of MUX 451c_2 (also referred to as the "second multiplexer"). Select line 415b_1 may correspond to select line 115b-2 of FIG. 1 (also referred to as the "third select line"). The first input SELIN<2> of MUX 451c_2 is connected to select line 415b_2, which may correspond to select line 115b-3 of FIG. 1 (also referred to as the "fifth select line"). The output of MUX 451c_2 may be connected to select line 415c_2, which may correspond to the select line 115c-3 of FIG. 1 (also referred to as the "fourth select line").

In some embodiments in which the control signal indicates that a regular convolution is to be performed by crossbar circuit 400, the output of each MUX in the crossbar circuit 400 is switched to the first input of the MUX. For example, the output of MUX 451a_0 is switched to its first input. Similarly, the output of MUX 451b_0 is also switched to its first input. The first input of MUX 451a_0 is connected to a first select signal SELIN<0>. As the output of MUX 451a_0 is connected to the select line 415a_0, the first select signal SELIN<0> is applied to the select line 415a_0 via MUX 451a_0. The cross-point devices that are connected to the first bit line BL_0 and the first plurality of word lines WL_2M, . . . , WL_3M−1 are thus selected and enabled for in-memory computing. As the select line 415a_0 is connected to the first input of the MUX 451b_0, the output of the MUX 451b_0 is also the first select signal. As such, the cross-point devices connected to the first bit line BL_0 and the second plurality of word lines are also selected for programming and in-memory computing. Similarly, the cross-point devices connected to the first bit line BL_0 and the third plurality of word lines may also be selected for programming and in-memory computing because the first input of MUX 451c_0 is connected to the select line 415b_0.

In some embodiments in which the control signal indicates that a depthwise convolution is to be performed, the output of each MUX in the crossbar circuit 400 is switched to the second input of the MUX. For example, the output of MUX 451a_0 is switched to its second input. When the second input D1 of MUX 451a_0 is connected to the second select signal SELIN_SHIFT<0>, the second select signal is applied to the select line 415a_0. The cross-point devices that are connected to the first select line 415a_0 (i.e., the cross-point devices that are connected to the first bit line BL_0 and the first plurality of word lines WL_2M, . . . , WL_3M−1) may be selected and enabled for programming and in-memory computing. As the first select line 415a_0 is connected to the second input of MUX 451b_1, the output of the MUX 451b_1 is also the second select signal. As the output of the MUX 451b_1 is connected to select line 415b_1, the cross-point devices connected to select line 415b_1 (i.e., the cross-point devices that are connected to the second bit line BL_1 and the second plurality of word lines WL_M, . . . , WL_2M−1) are selected and enabled for programming and in-memory computing. As select line 415b_1 is connected to the second input of MUX 451c_2, the cross-point devices that are connected to the third plurality of word lines and the third bit line BL_2 are also selected for programming and in-memory computing. The selected/enabled cross-point devices may be programmed to store depth-wise convolution kernels for performing depth-wise convolution operations.

FIG. 5A is a diagram illustrating an example regular convolution operation in accordance with some embodiments of the present disclosure.

Kernels 520a and 520b may be used to perform regular convolution on input data 510 to produce outputs 530a and 530b. Each of kernels 520a and 520b may be a 3×3×3 filter, filled with a set of weights. The size of input data 510 may be defined by its width (w), height (h), and channels (c). As an example, input data 510 may be a 6×6×3 volume including a first channel 510a, a second channel 510b, and a third channel 510c. Each kernel 520a and kernel 520b may be applied to the input data 510 by multiplying a portion of input data 510 with the kernel elementwise and then summing all the results. For example, kernel 520a may be applied to a portion of input data 510 of the same size as that of kernel 520a and kernel 520b. A scalar multiplication of the first portion by kernel 520a may be performed to obtain the first element of the output 530a. Kernel 520a and kernel 520b may be used to scan each of a plurality of 3×3×3-sized portions of input data 510 to produce output 530a and output 530b, respectively. Each time the filter slides to a new location, the elementwise multiplication and sum operation described above is performed again. Applying each kernel 520a and 520b may produce a channel of the convolution result (i.e., a 4×4×1 output 530a or output 530b). The convolution result of the regular convolution may be a 4×4×2 output including a first channel 530a and a second channel 530b.

FIG. 5B is a diagram illustrating a depthwise convolution operation in accordance with some embodiments of the present disclosure.

Performing a depth-wise convolution on input data 510 may involve convolving each channel of input data 510 with a respective kernel corresponding to the channel and stacking the convolved outputs together. For example, performing depth-wise convolution on input data 510 may involve convolving a first channel 510a, a second channel 510b, and a third channel 510c of input data 510 using a kernel 540a, a kernel 540b, and a kernel 540c, respectively. Each of kernels 540a, 540b, and 540c may correspond to a channel of a depth-wise convolution kernel 540. Convolving first channel 510a of input data 510 with the kernel 540a may involve performing element-wise multiplication between an element of first channel 510a and an element of the kernel 540a that are located at the same position. Convolving the first channel 510a of input data 510 using kernel 540a may produce an output 550a. Convolving the second channel 510b of input data 510 using kernel 540b may produce an output 550b. Convolving the third channel 510c of input data 510 using the kernel 540c may produce an output 550c. The outputs 550a, 550b, and 550c may be stacked together as an output 550.

Figure 5C:
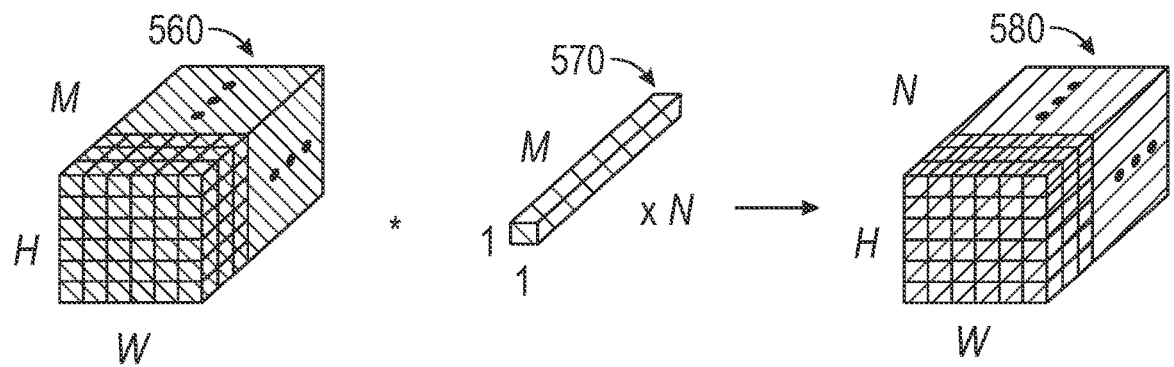
FIG. 5C is a diagram illustrating an example pointwise convolution operation in accordance with some embodiments of the present disclosure.

FIG. 5C is a diagram illustrating a pointwise convolution operation in accordance with some embodiments of the present disclosure.

As illustrated in FIG. 5C, a pointwise convolution may be performed on an M×H×W input 560 using an N×M×1×1 kernel 570 to produce an output 580. H and W are the height and width of the input 560, respectively. N is the number of output channels. M is the number of input channels. As an example, N=2 and M=3. Kernel 570 may be applied to input 560, for example, by taking a 1×1×3 portion of the input 560 (which corresponds to the three channels at a single spatial location) and multiplying it elementwise with kernel 570, then summing all the results. This operation is applied at each spatial location in input 560.

The result of the convolution operation at each spatial location is a number for each output channel, so the results are stored in an N×H×W output volume, where N=2 in this example. The output 580 may be a 2×H×W volume.

Figure 6A:
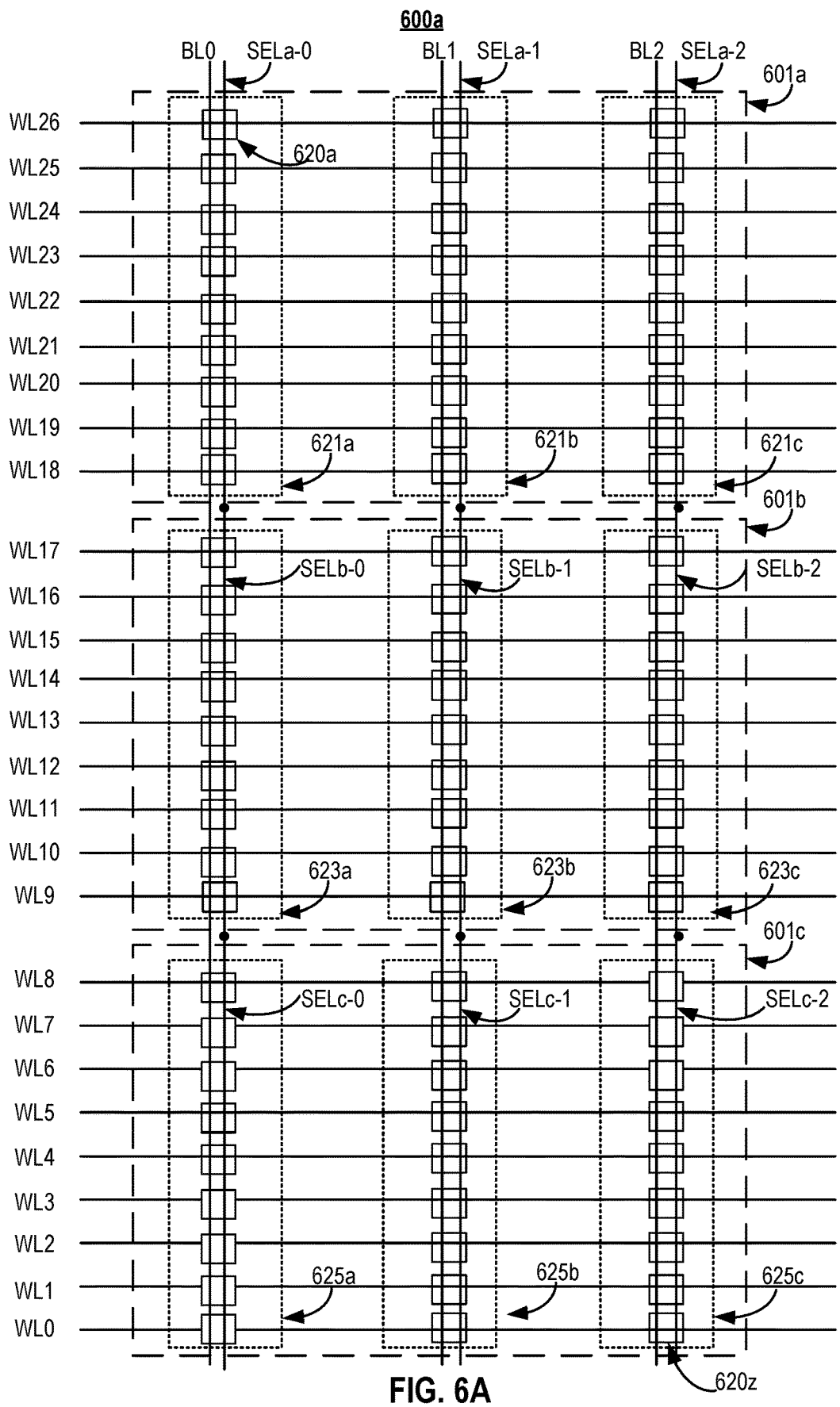
FIGS. 6A and 6B are schematic diagrams illustrating example crossbar circuits in accordance with some embodiments of the present disclosure.
Figure 6B:
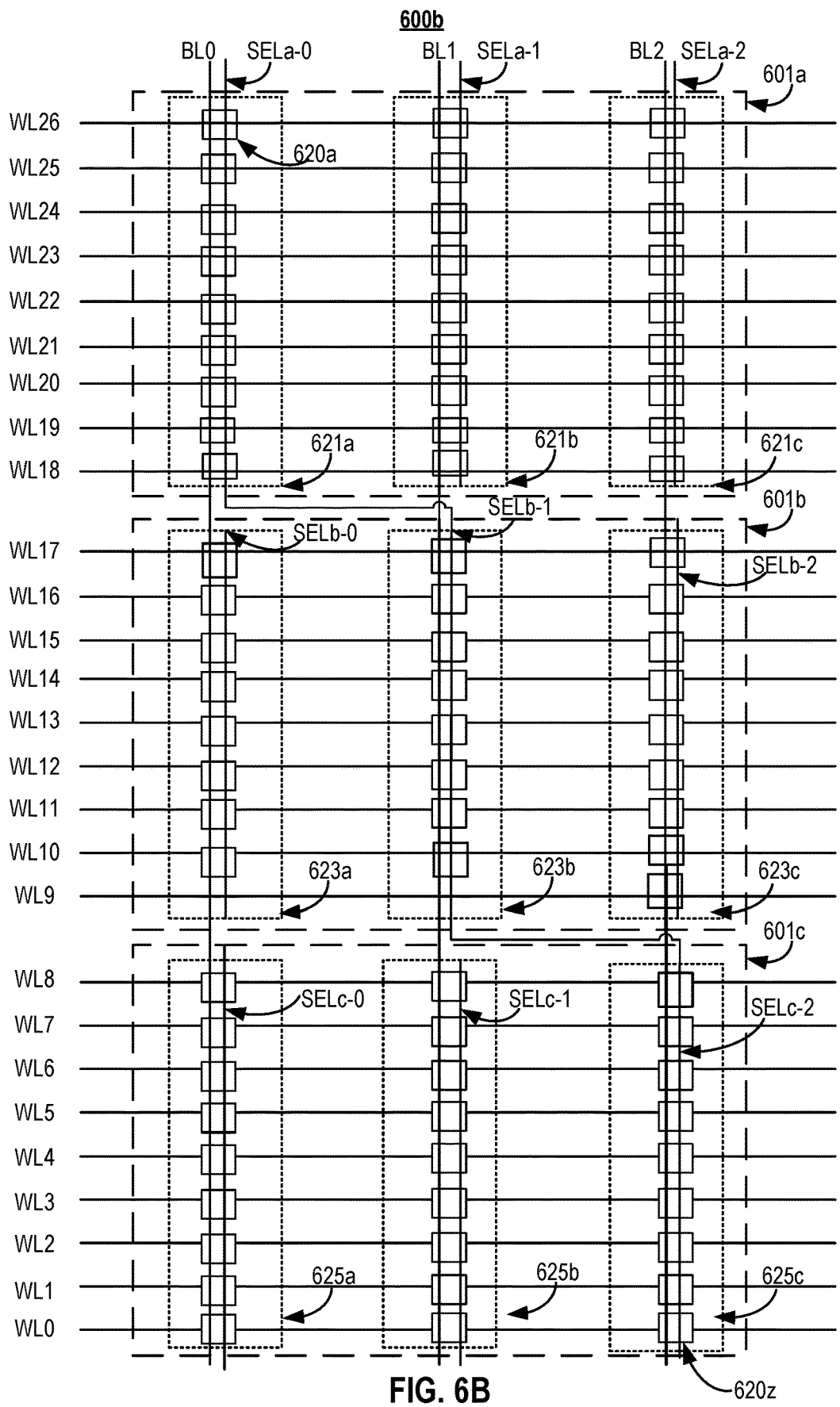

FIGS. 6A and 6B are schematic diagrams illustrating example crossbar circuits 600a and 600b in accordance with some embodiments. Crossbar circuits 600a and 600b may represent the same crossbar circuit configured to perform standard convolutions and depthwise convolutions, respectively.

As shown, crossbar circuit 600a and crossbar circuit 600b may include cross-point devices 620a, . . . , 620z connecting to word lines WL0, WL1, WL2, . . . , WL26, and bit lines BL0, BL1, and BL2. Crossbar circuit 600a and crossbar circuit 600b may further include select lines SELa-0, SELa-1, SELa-2, SELb-0, SELb-1, SELb-2, SELc-0, SELc-1, and SELc-2. The cross-point devices 620a-z may be arranged as a first crossbar array 601a, a second crossbar array 601b, and a third crossbar array 601c. Each of the first crossbar array 601a, the second crossbar array 601b, and the third crossbar array 601c may include cross-point devices connected to three bit lines and nine word lines. The cross-point devices that are connected to bit line BL_0, select line SELa-0, and one of the word lines WL18, WL19, . . . , WL26 are collectively referred to as cross-point devices 621a. The cross-point devices that are connected to bit line BL1, select line SELa-1, and one of the word lines WL18, WL19, . . . , WL26 are collectively referred to as cross-point devices 621b. The cross-point devices that are connected to bit line BL2, select line SELa-2, and one of the word lines WL18, WL19, . . . , WL26 are collectively referred to as cross-point devices 621c. The cross-point devices that are connected to bit line BL0, select line SELb-0, and one of the word lines WL9, WL10, . . . , WL17 are collectively referred to as cross-point devices 623a. The cross-point devices that are connected to bit line BL1, select line SELb-1, and one of the word lines WL9, WL10, . . . , WL17 are collectively referred to as cross-point devices 623b. The cross-point devices that are connected to bit line BL2, select line SELb-2, and one of the word lines WL9, WL10, . . . , WL17 are collectively referred to as cross-point devices 623c. The cross-point devices that are connected to bit line BL0, select line SELc-0, and one of the word lines WL0, WL1, . . . , WL8 are collectively referred to as cross-point devices 625a. The cross-point devices that are connected to bit line BL1, select line SELc-1, and one of the word lines WL0, WL1, . . . , WL8 are collectively referred to as cross-point devices 625b. The cross-point devices that are connected to bit line BL2, select line SELc-2, and one of the word lines WL0, WL1, . . . , WL8 are collectively referred to as cross-point devices 625c. In some embodiments, cross-point devices 621a, cross-point devices 621b, and cross-point devices 621c may correspond to cross-point devices 121a, cross-point devices 121b, and cross-point devices 121c of FIG. 1, respectively. Cross-point devices 623a, cross-point devices 623b, and cross-point devices 623c may correspond to cross-point devices 123a, cross-point devices 123b, and cross-point devices 123c of FIG. 1, respectively. Cross-point devices 625a, cross-point devices 625b, and cross-point devices 625c may correspond to cross-point devices 125a, cross-point devices 125b, and cross-point devices 125c of FIG. 1, respectively. Cross-point devices 621a, 621b, 623b, 625c, and 623c may also be referred to as the first plurality of cross-point devices, the second plurality of cross-point devices, the third plurality of cross-point devices, the fourth plurality of cross-point devices, and the fifth plurality of cross-point devices, respectively.

To perform regular convolution operations, as shown in FIG. 6A, select line SELa-0 may be connected to select line SELb-0, which is further connected to select line SELc-0. Select line SELa-1 may be connected to select line SELb-1, which is further connected to select line SELc-1. Select line SELa-2 may be connected to select line SELb-2, which is further connected to select line SELc-2. Performing a regular convolution operation as described in connection with FIG. 5A may involve storing kernel 520a of FIG. 5A in cross-point devices connected to a first bit line BL_0 and word lines WL0, WL1, . . . , WL26 by programming each of the cross-point devices 621a, 623a, and 620a to store a respective element of kernel 520a of FIG. 5A. Kernel 520b of FIG. 5A may be stored in cross-point devices connected to a second bit line BL1 and word lines WL0, WL1, . . . , WL26 by programming each of the cross-point devices 621b, 623b, and 625b to store a respective element of kernel 520b of FIG. 5A. A plurality of input signals representative of a portion of input data 510 to be convolved with the kernel may then be applied to the word lines WL_0, WL_1, . . . , WL_26. Each of the input signals may represent a respective element of the input data 510. The cumulative current output via the first bit line BL_0 may correspond to the first channel of the convolution result (e.g., output 530a of FIG. 5A). The cumulative current output via the second bit line BL1 may correspond to the second channel of the convolution results (e.g., output 530b of FIG. 5A).

To perform depthwise convolution operations, as shown in FIG. 6B, select line SELa-0 may be connected to select line SELb-1 (e.g., via a MUX as described herein, not shown in FIG. 6B). Select line SELb-1 is further connected to select line SELc-2 (e.g., via a MUX as described herein, not shown in FIG. 6B). As such, a select voltage applied to select line SELa-0 may also be applied to select lines SELb-1 and SELc-2. The cross-point devices connected to the select lines SELa-0, SELb-1, and SELc-2 are selected in response to the application of the select voltage to select line SELa-0. As an example, the kernels 540a, 540b, and 540c of FIG. 5B may be used for performing depthwise convolution operations as described in connection with FIG. 5B. For example, each of the cross-point devices 621a may be programmed to store a respective element of the kernel 540a of FIG. 5B. Each of the cross-point devices 623b may be programmed to store a respective element of the kernel 540b of FIG. 5B. Each of the cross-point devices 625c may be programmed to store a respective element of the kernel 540c. A plurality of input signals may be applied to the word lines WL0-WL26 to perform the depth-wise convolution operations. Each of the input signals may represent a portion of the input data (e.g., input data 510 of FIG. 5B) to be convolved. For example, each of the input signals applied to a word line WL18, . . . , WL26 may represent an element of the first channel 510a of the input data 510 as illustrated in FIG. 5B. Each of the input signals applied to a word line WL9, . . . , WL17 may represent an element of the second channel 510b of the input data 510 as illustrated in FIG. 5B. Each of the input signals applied to a word line WL0, . . . , WL8 may represent an element of the third channel 510c of the input data 510 as illustrated in FIG. 5B. As the first kernel 540a is mapped to cross-point devices connected to the first bit line BL0, the cumulative current output via the first bit line BL_0 may represent a convolution of the first channel of the input data and the first kernel (the output 550*a* of FIG. 5B). Similarly, the cumulative current output via the second bit line BL_1 may represent a convolution of the second channel of the input data and the second kernel (the output 550*b* of FIG. 5B). The cumulative current output via the third bit line BL_2 may represent a convolution of the third channel of the image and the third kernel (the output 550*c* of FIG. 5B).

As a further example, the crossbar circuit 600*a* may store the kernel 570 of FIG. 5C for performing pointwise convolution operations as described in connection with FIG. 5C. The cross-point devices connected to the word lines WL0, WL1, and WL2 and the bit lines BL0 and BL1 may be programmed to store the elements of a 1×1×M×N kernel 570 of FIG. 5C, where M=3, N=2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

The terms "approximately," "about," and "substantially" may be used to mean within ±20% of a target dimension in some embodiments, within ±10% of a target dimension in some embodiments, within ±5% of a target dimension in some embodiments, and yet within ±2% in some embodiments. The terms "approximately" and "about" may include the target dimension.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

The terms "first," "second," "third," "fourth," etc. as used herein are meant as labels to distinguish among different elements and may not necessarily have an ordinal meaning according to their numerical designation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. An apparatus, comprising:
   a plurality of crossbar arrays of cross-point devices, comprising:
      a first plurality of cross-point devices connecting to a first plurality of word lines, a first bit line, and a first select line;
      a second plurality of cross-point devices connecting to the first plurality of word lines, a second bit line, and a second select line; and
      a third plurality of cross-point devices connecting to a second plurality of word lines, the second bit line, and a third select line; and
   one or more select circuits configured to:
      select the first plurality of cross-point devices and the second plurality of cross-point devices in response to receiving a first control signal indicating that a regular convolution is to be performed using the plurality of crossbar arrays of cross-point devices; and
      select the first plurality of cross-point devices and the third plurality of cross-point devices in response to receiving a second control signal indicating that a depthwise convolution is to be performed using the plurality of crossbar arrays of cross-point devices.

2. The apparatus of claim 1, wherein the one or more select circuits comprise a first multiplexer, wherein a first input of the first multiplexer is connected to the second select line, a second input of the first multiplexer is connected to the first select line, and wherein an output of the first multiplexer is connected to the third select line.

3. The apparatus of claim 2, wherein the first multiplexer is configured to switch between the first input of the first multiplexer and the second input of the first multiplexer based on a control input of the first multiplexer, and wherein the first control signal and the second control signal are provided to the first multiplexer via the control input.

4. The apparatus of claim 2, wherein the one or more select circuits are further configured to select a fourth plurality of cross-point devices in response to receiving the second control signal, wherein the fourth plurality of cross-point devices is connected to a third plurality of word lines, a third bit line, and a fourth select line.

5. The apparatus of claim 4, wherein the one or more select circuits comprise a second multiplexer, wherein a first input of the second multiplexer is connected to a fifth select line, wherein a second input of the second multiplexer is connected to the third select line, and wherein an output of the second multiplexer is connected to the fourth select line.

6. The apparatus of claim 5, wherein a fifth plurality of cross-point devices is connected to the fifth select line, the second plurality of word lines, and the third bit line.

7. The apparatus of claim 1, wherein the plurality of crossbar arrays of cross-point devices comprises at least one of a phase-change memory device, a floating gate device, a spintronic device, a ferroelectric device, or a resistive random-access memory device.

8. The apparatus of claim 1, further comprising a programming circuit to program conductance of the selected cross-point devices.

9. The apparatus of claim 1, further comprising a word line logic to provide input signals to the first plurality of word lines and the second plurality of word lines.

10. The apparatus of claim 9, further comprising a sensing circuit to generate a plurality of output signals representative of convolution results of the input signals and one or more convolution kernels.

11. The apparatus of claim 1, further comprising a control circuit configured to produce the first control signal and the second control signal.

* * * * *